(12) United States Patent
Kim

(10) Patent No.: US 8,195,107 B2
(45) Date of Patent: Jun. 5, 2012

(54) SIGNAL TRANSMISSION SYSTEM AND SIGNAL TRANSMISSION METHOD THEREOF

(75) Inventor: Kwan-Dong Kim, Ichon (KR)

(73) Assignee: SN hynix Inc. (KR)

( * ) Notice: Subject to any disclaimer, the term of this patent is extended or adjusted under 35 U.S.C. 154(b) by 761 days.

(21) Appl. No.: 12/346,977

(22) Filed: Dec. 31, 2008

(65) Prior Publication Data
US 2010/0062720 A1   Mar. 11, 2010

(30) Foreign Application Priority Data
Sep. 9, 2008 (KR) .................. 10-2008-0088669

(51) Int. Cl.
*H01Q 11/12* (2006.01)
(52) U.S. Cl. .................. 455/127.1; 327/108
(58) Field of Classification Search .................. 327/108; 455/114.3, 127.1, 127.2
See application file for complete search history.

(56) References Cited

U.S. PATENT DOCUMENTS

| | | | |
|---|---|---|---|
| 6,704,818 B1 | 3/2004 | Martin et al. | |
| 7,203,243 B2 * | 4/2007 | Deas et al. | 375/257 |
| 7,287,108 B2 * | 10/2007 | Greeff et al. | 710/100 |
| 7,397,712 B2 | 7/2008 | Choi et al. | |
| 7,443,211 B2 * | 10/2008 | Liu | 327/108 |
| 7,545,164 B2 * | 6/2009 | Song et al. | 326/30 |
| 2006/0034134 A1 | 2/2006 | Choi et al. | |

FOREIGN PATENT DOCUMENTS
| | | |
|---|---|---|
| KR | 1020060038759 | 5/2006 |
| KR | 100670685 | 1/2007 |

* cited by examiner

*Primary Examiner* — Jeffrey Zweizig
(74) *Attorney, Agent, or Firm* — Baker & McKenzie LLP

(57) ABSTRACT

A signal transmission system includes a transmitting unit configured to drive an input signal and to transmit the input signal, a pre-emphasis unit configured to detect a change in a voltage level of the input signal and to amplify a voltage of an output signal of the transmitting unit for a predetermined time, and a receiving unit configured to receive the output signal from the transmitting unit.

10 Claims, 2 Drawing Sheets

SIGNAL TRANSMISSION SYSTEM AND SIGNAL TRANSMISSION METHOD THEREOF

CROSS-REFERENCES TO RELATED APPLICATION

The present application claims priority under 35 U.S.C. §119(a) to Korean application number 10-2008-0088669, filed on Sep. 9, 2008, in the Korean Intellectual Property Office, which is incorporated herein by reference in its entirety as set forth in full.

BACKGROUND

1. Technical Field

The embodiments described herein relate to a signal transmission system, and more particularly, to a signal transmission system and a signal transmission method.

2. Related Art

In general, a signal transmission system uses a termination scheme in order to transmit a signal at a high speed. The termination scheme may be classified into a center-tap termination configuration and a high-tap termination configuration.

In the center-tap termination configuration, a voltage level of a signal to be transmitted is increased or decreased by a predetermined level on the basis of a voltage level that corresponds to one-half a voltage level of a power supply voltage. In the high-tap termination configuration, a voltage level of a signal to be transmitted is decreased by a predetermined level on the basis of a voltage level of a power supply voltage.

FIG. 1 a schematic circuit diagram of a conventional signal transmission system. In FIG. 1, the signal transmission system 1 includes the center-tap termination configuration having a transmitting unit TX connected to a receiving unit RX through a channel 10. In addition, termination resistors RT are connected between the channel 10 and a power supply terminal, and between the channel 10 and a ground terminal. Here, the center-tap designation refers to the arrangement of the termination resistors RT between the channel 10, the power supply terminal, and the ground terminal.

FIG. 2 is a schematic circuit diagram of another conventional signal transmission system. In FIG. 2, the signal transmission system 2 includes the high-tap termination configuration having a transmitting unit TX connected to a receiving unit RX through a channel 20. In addition, a termination resistor RT is connected only between the channel 20 and a power supply terminal. Here, the high-tap designation refers to the arrangement of the termination resistor RT between the channel 20 and the power supply terminal.

In FIGS. 1 and 2, the channel 20 is used as a signal transmission path between the transmitting unit TX and the receiving unit RX and provides for low pass filtering, which deteriorates signal transmission characteristics. For example, with a signal transmitted at a high speed, the channel 20 functions as a low pass filter to decrease a slew rate of a transmission signal, but deteriorates a high frequency component of the transmission signal, which results in increasing a jitter component of the signal. Accordingly, since it is not possible to compensate for the effect of lower pass filtering by the channel 20, signal transmission efficiency is lowered.

SUMMARY

A signal transmission system and a signal transmission method capable of improving signal transmission efficiency is described herein.

In one embodiment, a signal transmission system includes a transmitting unit configured to drive an input signal and to transmit the input signal, a pre-emphasis unit configured to detect a change in a voltage level of the input signal and to amplify a voltage of an output signal of the transmitting unit for a predetermined time, and a receiving unit configured to receive the output signal from the transmitting unit.

In another embodiment, a signal transmission system includes a transmitting unit configured to drive an input signal and to transmit the input signal, a pre-emphasis unit configured to detect a change in a voltage level of the input signal and to amplify a voltage of an output signal of the transmitting unit for a predetermined time, a current amount compensating unit configured to compensate a change in a current amount of the transmitting unit and the pre-emphasis unit in response to a change in at least one of a Process, Voltage, Temperature condition, and a receiving unit configured to receive an output signal from the transmitting unit.

In another aspect, a signal transmission method of a signal transmission system, in which a transmitting terminal and a receiving terminal are connected to each other through a channel that performs a high-tap termination process on an output signal of the transmitting terminal, includes detecting a change in a voltage level of an input signal that is input to the transmitting terminal, and amplifying a voltage level of the output signal for a predetermined time when the change in the voltage level of the input signal is detected.

In another aspect, a signal transmission system includes a transmitting unit receiving an input signal, a delay element configured to delay the input signal for a predetermined time and to output a delayed output signal, a logic circuit unit configured to perform a logic operation on the input signal and the delayed output signal, and a receiving unit configured to receive the delayed output signal, wherein the delayed output signal is amplified for the predetermined time when a change in the input signal is detected.

These and other features, aspects, and embodiments are described below in the section "Detailed Description."

BRIEF DESCRIPTION OF THE DRAWINGS

Features, aspects, and embodiments are described in conjunction with the attached drawings, in which.

DETAILED DESCRIPTION

Figure 1:
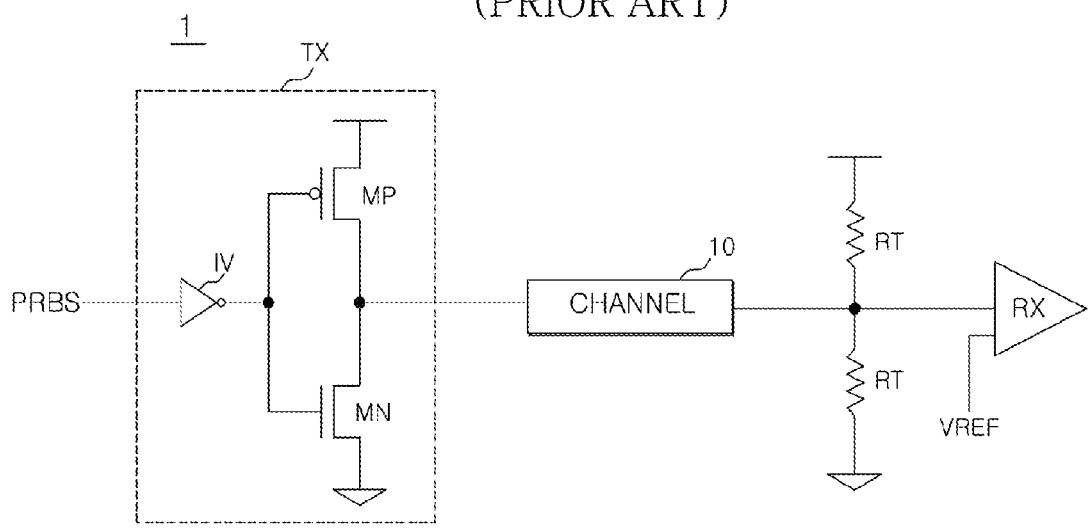
FIG. 1 a schematic circuit diagram of a conventional signal transmission system.
Figure 2:
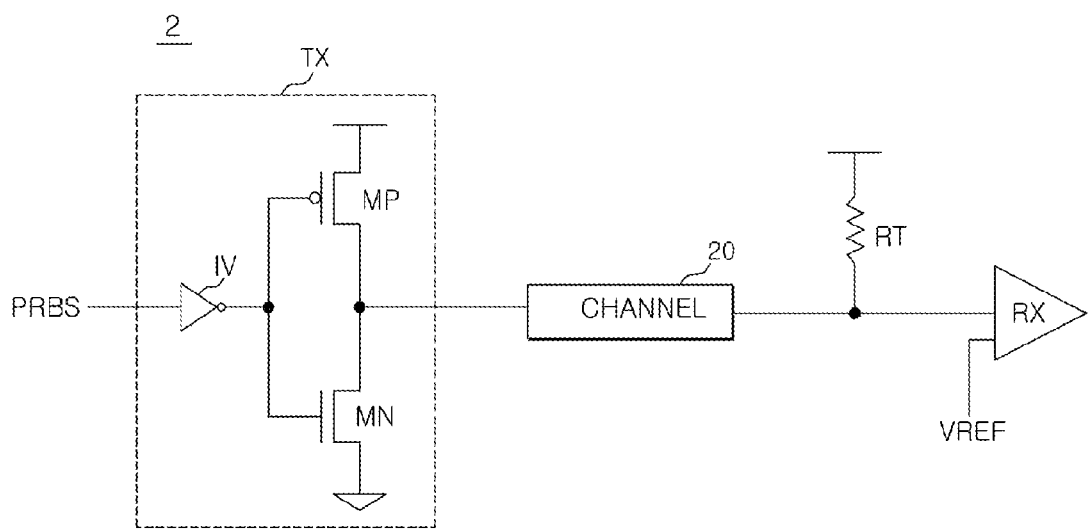
FIG. 2 is a schematic circuit diagram of another conventional signal transmission system.
Figure 3:
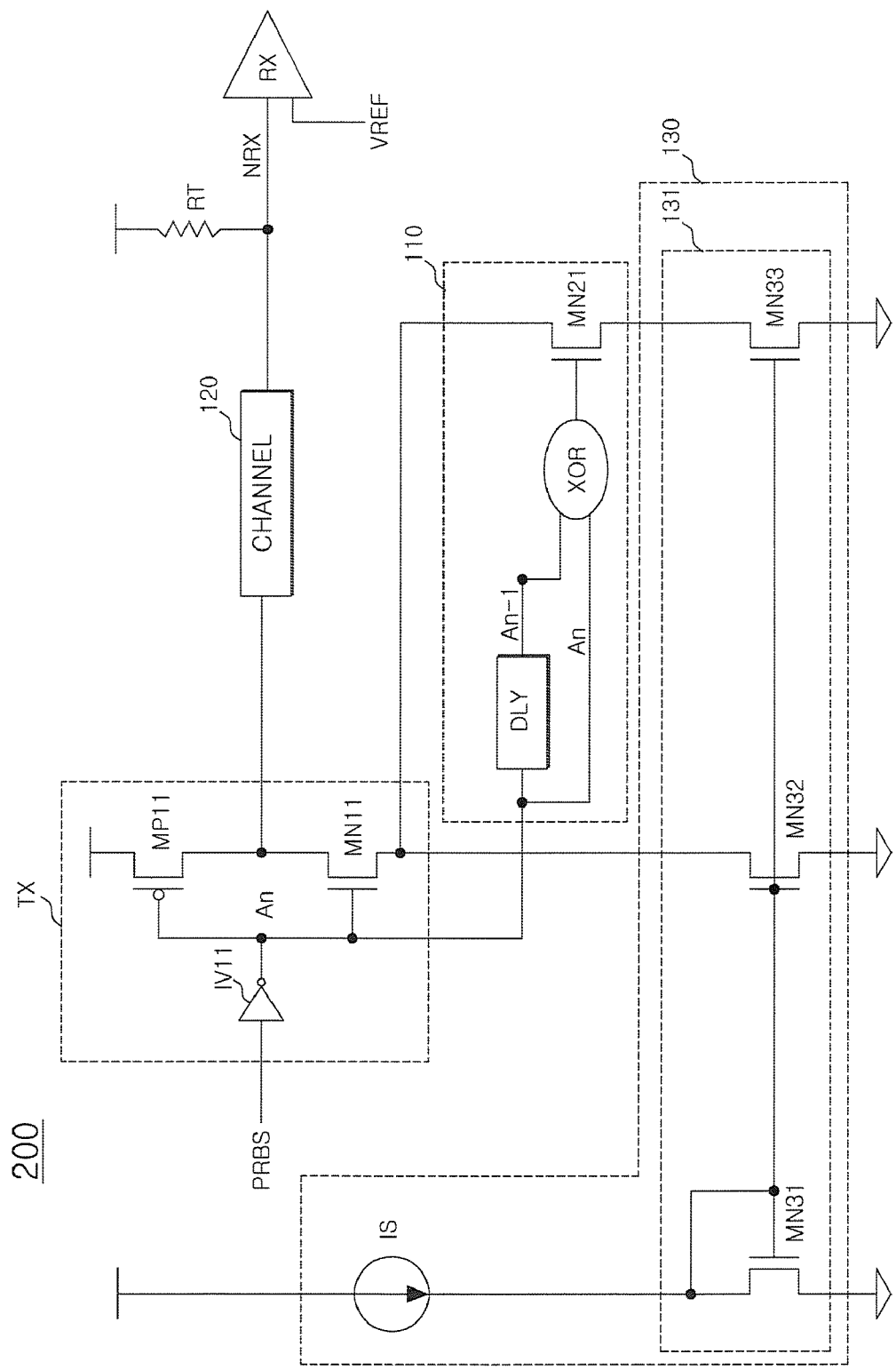
FIG. 3 is a schematic circuit diagram of an exemplary signal transmission system according to one embodiment.

FIG. 3 is a schematic circuit diagram of an exemplary signal transmission system according to one embodiment. In FIG. 3, the exemplary signal transmission system includes a high-tap termination configuration, wherein a pre-emphasis function can be performed, and the amount of current, which can be generated when the pre-emphasis function is performed and a signal is transmitted, can be constantly maintained to correspond to a change in Process/Voltage/Temperature (PVT) conditions.

In FIG. 3, the signal transmission system 200 can include a transmitting unit TX, a pre-emphasis unit 110, a channel 120, a current amount compensating unit 130, and a receiving unit RX. Here, the signal transmission system 200 can be arranged in a high-tap termination configuration using a termination resistor RT connected between the channel 120 and a power supply terminal.

In FIG. 3, the transmitting unit TX can include an inverter IV and first and second transistors MP11 and MN11, wherein the inverter IV can receive an input signal 'PRBS'. The input signal 'PRBS' can includes an input signal pattern, and can use, for example, a pseudo random bit sequence (PRBS). In addition, gate terminals of the first and second transistors MP11 and MN11 can be supplied with an output signal from the inverter IV, and drain terminals of the first and second transistors MP11 and MN11 can be connected to each other. A power supply terminal can be connected to a source terminal of the first transistor MP11.

The pre-emphasis unit 110 can include a delay element DLY, an XOR logic XOR, and a third transistor MN21, wherein the delay element DLY can receive an output signal from the inverter IV. The XOR logic XOR can receive an output signal from the delay element DLY and the output signal from the inverter IV. The third transistor MN21 can have a drain terminal connected to a source terminal of the second transistor MN11 and a gate terminal receiving an output signal from the XOR logic XOR.

When a voltage level of the input signal 'PRBS' changes from a high level to a low level, the pre-emphasis unit 110 can increase a current amount of the transmitting unit TX for a predetermined time, for example, a delay time by the delay element DLY in accordance with the operation of the third transistor MN21. Accordingly, the pre-emphasis unit 110 can perform a pre-emphasis operation for amplifying a voltage of an output signal of the transmitting unit TX.

In FIG. 3, the current amount compensating unit 130 can be configured such that the amount of current flowing through the second transistor MN11 and the third transistor MN21 can be constantly maintained, regardless of a change in a PVT condition. For example, the current amount compensating unit 130 can include a current source IS and a current mirror 131.

The current source IS can be configured such that a constant current is supplied regardless of a change in a PVT condition, and may be implemented using a band-gap circuit interior to or external of the signal transmission system 200.

The current mirror 131 can include fourth, fifth, and sixth transistors MN31, MN32, and MN33. The fourth transistor MN31 can have a drain terminal connected to the current source IS, a gate terminal connected to the drain terminal thereof, and a source terminal connected to a ground terminal. The fifth transistor MN32 can have a source terminal connected to the ground terminal and a drain terminal connected to a source terminal of the second transistor MN11 of the transmitting unit TX. The sixth transistor MN33 can have a source terminal connected to the ground terminal and a drain terminal connected to the source terminal of the third transistor MN21 of the pre-emphasis unit 110. The gate terminals of the fourth, fifth, and sixth transistors MN31, MN32, and MN33 can be connected to each other.

An exemplary operation of the signal transmission system will now be described with reference to FIG. 3.

First, when the input signal 'PRBS' is a high level, the first node (An) can be at a low level, wherein the first transistor MP11 can be turned ON. In addition, the voltage level of the third node (NRX) of the receiving unit RX can increase to a voltage level of the power supply terminal by the first transistor MP11 and the termination resistor RT.

However, if the voltage level of the input signal 'PRBS' changes to a low level, then the voltage level of the first node (An) can become a high level and the voltage level of the second node (An−1) can be maintained at a low level. Since the first node (An) is at a high level, the first transistor MP11 can be turned OFF and the second transistor MN11 can be turned ON. In addition, since the first node (An) is at a high level and the second node (An−1) is at a low level, the XOR logic XOR can output a high-level signal and the third transistor MN21 can be turned ON.

Then, the voltage level of the third node (NRX) can be reduced proportional to the total amount of current that flows through the second transistor MN11, the fifth transistor MN32, the third transistor MN21, the sixth transistor MN33, and the termination resistor RT. Accordingly, since the voltage level of the input signal 'PRBS' can change, the amount of current needs to be added due to the third transistor MN21 and the sixth transistor MN33, wherein a voltage drop is large.

Then, when the voltage level of the input signal 'PRBS' is continuously maintained at a low level, the voltage level of the second node (An−1) can change to a high level after the delay time of the delay element DLY. Accordingly, a voltage level of the output signal from the XOR logic XOR can be maintained at a high level from a point of time when the voltage level of the input signal 'PRBS' changes from a high level to a low level and then changes to a low level after the delay time of the delay element DLY.

Since the output signal from the XOR logic XOR is at a low level, the third transistor MN21 can be turned OFF. Then, the voltage level of the third node (NRX) can become a level proportional to the total amount of current that flows through the second transistor MN11, the fifth transistor MN32, and the termination resistor RT. For example, the voltage level of the third node (NRX) can become higher than a level that is reduced proportional to the total amount of current that flows through the second transistor MN11, the fifth transistor MN32, the third transistor MN21, the sixth transistor MN33, and the termination resistor RT.

Accordingly, it is possible to perform a pre-emphasis function that temporarily increases a voltage drop of the input signal 'PRBS' whose voltage level can change from a high level to a low level, that is, a voltage drop of a high frequency signal component by the delay time of the delay element DLY. In addition, during the process in which the input signal is transmitted, the current can be maintained at a predetermined ratio by the current amount compensating unit 130, regardless of a change in a PVT condition. As a result, it is possible to stabilize a voltage level of a transmission signal. Thus, the high frequency signal component can be prevented from being lost due to the effect of low pass filtering by the channel, and the amount of current is constantly maintained, thereby improving signal transmission efficiency.

While certain embodiments have been described above, it will be understood that the embodiments described are by way of example only. Accordingly, the device and methods described herein should not be limited based on the described embodiments. Rather, the device and methods described herein should only be limited in light of the claims that follow when taken in conjunction with the above description and accompanying drawings.

What is claimed is:
1. A signal transmission system, comprising:
   a transmitting unit configured to drive an input signal and to transmit the input signal;
   a pre-emphasis unit configured to detect a change in a voltage level of the input signal and to amplify a voltage of an output signal of the transmitting unit for a predetermined time;

a current amount compensating unit configured to compensate a change in a current amount of the transmitting unit and the pre-emphasis unit in response to a change in at least one of a Process, Voltage, Temperature condition; and a receiving unit configured to receive an output signal from the transmitting unit.

2. The signal transmission system of claim 1, further comprising a channel configured to perform a high-tap termination process on the output signal of the transmitting unit and to transmit the output signal to the receiving unit.

3. The signal transmission system of claim 2, wherein the pre-emphasis unit is configured to detect when a voltage level of the input signal changes from a high level to a low level and to amplify the voltage of the output signal of the transmitting unit for the predetermined time.

4. The signal transmission system of claim 3, wherein the pre-emphasis unit is configured to increase a current amount of the transmitting unit for the predetermined time when the voltage level of the input signal changes from the high level to the low level.

5. The signal transmission system of claim 4, wherein the transmitting unit includes a first current path configured to be opened in accordance with the input signal.

6. The signal transmission system of claim 5, wherein the pre-emphasis unit includes:
   a delay element configured to delay the input signal for the predetermined time;
   an XOR logic configured to perform an XOR operation on the input signal and an output signal from the delay element; and
   a second current path that is connected to the first current path and configured to be opened in accordance with an output of the XOR logic.

7. The signal transmission system of claim 2, wherein the current amount compensating unit is configured to maintain a current amount of the transmitting unit and the pre-emphasis unit constantly at a predetermined ratio using a current source having a constant current amount.

8. The signal transmission system of claim 7, wherein the current amount compensating unit includes:
   a current source; and
   a current mirror configured to maintain a current amount of the transmitting unit and a current amount of the pre-emphasis unit constantly at the predetermined ratio in accordance with a control voltage that is used to convert a current from the current source.

9. A signal transmission system, comprising:
   a transmitting unit receiving an input signal;
   a delay element configured to delay the input signal for a predetermined time and to output a delayed output signal;
   a logic circuit unit configured to perform a logic operation on the input signal and the delayed output signal;
   a receiving unit configured to receive the delayed output signal; and
   a current amount compensating unit configured to compensate a change in a current amount of the transmitting unit in response to a change in at least one of a Process, Voltage, Temperature condition of the signal transmission system, wherein
   the delayed output signal is amplified for the predetermined time when a change in the input signal is detected.

10. A signal transmission system, comprising:
    a transmitting unit receiving an input signal;
    a delay element configured to delay the input signal for a predetermined time and to output a delayed output signal;
    a logic circuit unit configured to perform a logic operation on the input signal and the delayed output signal;
    a receiving unit configured to receive the delayed output signal;
    a channel interconnecting the transmitting unit and the receiving unit;
    a termination resistor connected between the channel and a power supply terminal of the signal transmission system; and
    a current amount compensating unit configured to compensate a change in a current amount of the transmitting unit in response to a change in at least one of a Process, Voltage, Temperature condition of the signal transmission system, wherein
    the delayed output signal is amplified for the predetermined time when a change in the input signal is detected.

* * * * *